United States Patent [19]
Bartels et al.

[11] Patent Number: 4,872,991
[45] Date of Patent: Oct. 10, 1989

[54] TREATMENT OF WATER

[75] Inventors: Craig R. Bartels; Tansukhlal G. Dorawala, both of Wappingers Falls, N.Y.; Michael T. Stephenson, Katy, Tex.; Mordechai Pasternak, Spring Valley; John Reale, Jr., Wappingers Falls, both of N.Y.

[73] Assignee: Texaco Inc., White Plains, N.Y.

[21] Appl. No.: 214,981

[22] Filed: Jul. 5, 1988

[51] Int. Cl.4 .......................... B01D 13/00; C02F 1/40
[52] U.S. Cl. .................................... 210/651; 210/654; 210/799; 210/804; 210/805; 210/806

[58] Field of Search ........ 210/638, 650, 651, 804–806, 210/654, 799

[56] References Cited
U.S. PATENT DOCUMENTS
4,752,363  6/1988  Buckley et al. ..................... 204/128

Primary Examiner—Ivars Cintins
Attorney, Agent, or Firm—Robert A. Kulason; James J. O'Loughlin; Carl G. Seutter

[57] ABSTRACT

Aqueous liquor containing immiscible hydrocarbon liquid, such as produced water from an offshore petroleum drilling platform, is treated by gravity separation, skimming, and nanofiltration.

17 Claims, No Drawings

TREATMENT OF WATER

FIELD OF THE INVENTION

This invention relates to the treatment of aqueous media containing hydrocarbon liquid to attain product aqueous media containing lesser amounts of hydrocarbon.

BACKGROUND OF THE INVENTION

As is well known to those skilled in the art, waste water may contain a wide variety of undesirable components which may restrict its use or disposal by passage to natural bodies of water. Illustrative of industrial waters which may normally be discharged into adjoining bodies of water is the aqueous discharge from an oil production platform. These platforms are constructed in fresh water lakes or more commonly in salt water bodies in which drilling is carried out and in due course production of hydrocarbons. Prior to further treatment of the hydrocarbons it is necessary to separate them from the produced water which is passed to waste.

Produced water contains a wide variety of components depending upon the details of operation. It may contain dissolved water-soluble salts typified by those present in sea water, which commonly contains the following:

TABLE

| Element | Parts per Million (w) |
|---|---|
| Cl | 18,980 |
| Na | 10,561 |
| Mg | 1,272 |
| S | 884 |
| Ca | 400 |
| K | 380 |
| Br | 65 |
| C (inorg) | 28 |
| Sr | 13 |
| ($SiO_2$) | 0.01–7.0 |
| B | 4.6 |
| Si | 0.02–4.0 |
| C (org) | 1.2–3.0 |
| Al | 0.16–1.9 |
| F | 1.4 |

Many other elements may be present in amounts each less than about 1 ppm. See Handbook of Chemistry and Physics (44 Ed) 1962, Page 3488.

Commonly sea water is considered as being a dilute solution of sodium chloride containing about 3.5 w% thereof.

In typical production platforms, as the hydrocarbon is recovered from the undersea sources, there is discharged a substantial portion of produced water including formation water and injected water. Formation water is that water which is naturally present in the oil or gas reservoir. This may amount to as little as less than 1 v% at the beginning of production but typically increases during the life of the well. Injected water is typically sea water which has been injected into the well to enhance the recovery of hydrocarbon (See for example Somerville et al *Environmental Effect of Produced water from North Sea Oil Operations* Marine Pollution Bulletin Vol 18, No 10, pp 549-558 (1987) Great Britain).

Produced water may contain non-hydrocarbon organic matter, largely as salts of lower aliphatic carboxylic acids such as acetic, propionic, butyric acids, commonly in amounts up to about one gram per liter. The produced water may also contain 20–40 mg/l of dissolved hydrocarbons including benzene, toluene, and xylene. This produced water is accompanied by immiscible hydrocarbons, typified by crude petroleum in amounts up to 0.1 w%; and it may also contain in suspension, insoluble solids, typically in amount up to say 0.1 w%.

Other aqueous media which may be treated by the process of this invention include various waste waters from industrial sources. For background on the problems generated by these liquids and some attempts to solve those problems, the following may be noted:

(i) European Pat. No. 251,691 to the Water Research Commission, Transvaal, South Africa as assignee of Buckley et al published Jan. 7, 1988;

(ii) Simpson et al, *The Effect of PH on the Nanofiltration of the Carbonate System in Solution,* Desalination 64 (1987) pp 305–319.

(iii) Bindoff et al, *The Nanofiltration and Reuse of effluent from the Caustic Extraction Stage of Wood Pulping,* Desalination 67 (1987) pp 455–465.

(iv) Mickley, *A Charged Ultrafiltration Membrane Process for Water Softening,* IDA Journal 1 (1) (1985) March, pp 1–14

(v) Koros et al, *Polymeric Membrane Materials for Solution Diffision Based Permeation Separations* (private Communication).

No completely economically satisfactory solution to the problem has been found—particularly as it relates to the treatment of produced water on offshore drilling platforms—to yield a water of sufficient purity so that it meets governmental discharge limits applicable to water which is discharged into the sea.

Prior attempts to solve this problem have included the use of settling and/or skimming basins; but these have not proven to be economically desirable because inter alia they are characterized by size and weight which is undesirably high when measured against the limitations of e.g. an off-shore drilling platform.

It is an object of this invention to provide a novel process for treating an aqueous medium containing hydrocarbon liquid to attain a product aqueous medium containing a lesser amount of hydrocarbon. Other objects will be apparent to those skilled in the art.

STATEMENT OF THE INVENTION

In accordance with certain of its aspects this invention is directed to a method of treating an aqueous charge containing immiscible hydrocarbon liquid which comprises maintaining said aqueous charge containing immiscible hydrocarbon liquid in a quiescent separating operation thereby producing (i) a supernatant lighter layer of hydrocarbon liquid and (ii) a heavier layer of aqueous liquid containing a reduced amount of immiscible hydrocarbon liquid;

withdrawing said supernatant lighter layer of hydrocarbon liquid;

passing said heavier layer of aqueous liquid containing a reduced amount of immiscible hydrocarbon liquid to a quiescent skimming operation thereby producing (i) an upper lighter layer of hydrocarbon liquid and (ii) a lower layer of aqueous liquid containing a decreased amount of immiscible hydrocarbon liquid;

recycling said upper lighter layer of hydrocarbon liquid recovered from said quiescent skimming operation to said quiescent separating operation;

passing said lower layer of aqueous liquid containing a decreased amount of immiscible hydrocarbon liquid from said quiescent skimming operation to a nanofiltration operation;

nanofiltering said lower layer of aqueous liquid containing a decreased amount of immiscible hydrocarbon liquid thereby forming (i) aqueous filtrate containing a diminished amount of immiscible hydrocarbon liquid and (ii) aqueous retentate containing immiscible hydrocarbon liquid;

recycling said aqueous retentate containing immiscible hydrocarbon liquid to said separating operation or said skimming operation; and recovering said aqueous filtrate containing a diminished amount of immiscible hydrocarbon liquid.

DESCRIPTION OF THE INVENTION

The aqueous charge liquids containing immiscible hydrocarbon liquid which may be treated by the process of this invention may include liquids from a wide variety of sources such as those derived from a wide variety of industrial sources. These liquids may be aqueous liquids which contain immiscible hydrocarbons (including crude petroleum derived hydrocarbons or slop water as found in refinery operations) in amounts ranging from as low as parts per million amounts up to high percentages i.e. up to liquids which may be characterized as crude petroleum containing 20–80 w%, say 50 w% sea water.

In a typical off-shore drilling operation, the aqueous liquid of particular interest may be produced water. Produced water is water recovered with hydrocarbons from the well and includes injected water (that injected into the well to assist in displacement of the oil) and formation water (that which is found in the well with the oil).

This produced water may contain:
(i) Inorganic soluble salts typified by the normal soluble components of sea water;
(ii) Inorganic insoluble salts typified by finely divided particles of e.g. calcium carbonate, calcium sulfate etc or by soluble salts present in excess of their solubility;
(iii) Non-hydrocarbon organic matter typified by salts of lower aliphatic carboxylic acids such as acetic, propionic, butyric, etc. or naphthenic acids (these may be present as soluble or as non-soluble compositions)
(iv) Hydrocarbons including soluble and insoluble hydrocarbons typified by the crude petroleum found in produced water.

An illustrative specific produced water obtained on an off-shore drilling platform may contain:

TABLE

| Component | W % Broad | Typical |
|---|---|---|
| Soluble inorganic salts | 0.1–10 | 5 |
| Insoluble inorganic salts | 0.01–0.5 | 0.1 |
| Soluble organic salts | 0.0005–0.1 | 0.01 |
| Insoluble organic salts | 0.01–0.5 | 0.1 |
| Hydrocarbons | 20–80 | 50 |

Superficially the aqueous charge may contain 20–80 w%, say 50 w% water and 20–80 w%, say 50 w% immiscible hydrocarbon liquid.

In practice of the process of this invention, the aqueous charge liquid containing immiscible hydrocarbon liquid may be maintained in a quiescent separating operation. The liquid may be maintained in the settling operation at 30° C.–90° C., say 50° C. for 6–48 hours, say 12 hours. During this period, there is formed a supernatant lighter layer of hydrocarbon liquid and a heavier layer of aqueous liquid containing a reduced amount of immiscible hydrocarbon liquid.

Typically the supernatant lighter layer of hydrocarbon liquid may be 20–80 w%, say 50 w% of the total. This supernatant lighter layer may typically contain less than 2 w%, say 0.1–1 w% of aqueous liquid; and it may be withdrawn and passed to oil recovery i.e. passed as dry crude to storage for further processing.

The heavier layer of aqueous liquid, containing a reduced amount of immiscible hydrocarbon liquid, typically 0.01 w%–0.5 w%, say 0.1 w%, is passed to a quiescent skimming operation. Here the body of liquid is maintained at 30° C.–90° C., say 40° C. for 6–48 hours, say 12 hours. During this quiescent period, the reduced amount of residual hydrocarbon separates and forms an upper lighter layer of hydrocarbon liquid which may be skimmed off and, if desired, recycled to the quiescent separating operation.

The lower layer of aqueous liquid formed in the skimming operation may contain a decreased amount of immiscible hydrocarbon liquid typically in amount of 20–400 (w) ppm, say 160 (w) ppm. This lower layer of aqueous liquid containing a decreased amount of immiscible hydrocarbon liquid may be withdrawn from the skimming operation and passed to a nanofiltration operation.

THE MEMBRANE ASSEMBLY

Practice of the process of this invention may be carried out by passing the lower aqueous layer containing a decreased amount of immiscible hydrocarbon liquid from said quiescent skimming operation to a nanofiltration operation. Nanofiltration may be carried out by use of a composite structure which in one preferred embodiment may include a carrier layer which provides mechanical strength, a porous support layer, and a nanofiltering separating layer or membrane across which nanofiltration occurs.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, non-woven fibrous polyester.

A preferred non-woven polyester carrier layer may be formulated of non-woven, thermally-bonded strands of polyester and characterized by a fabric weight of 80±8 grams per square yard, a thickness of 4.2±0.5 mils, a tensile strength (in the machine direction) of 31 psi and (in cross direction) of 10 psi, and a Frazier air permeability of 6 cu. ft/min./sq. ft. @ 0.5 inches of water.

THE POROUS SUPPORT LAYER

The porous support layer useful in practice of the process of this invention may be preferably formed of a sheet of polysulfone polymer. Typically the polysulfone may be of thickness of 40–80 microns, say 50 microns and of molecular weight $M_n$ of 5,000–100,000, preferably 20,000–60,000, say 40,000. The polysulfone is preferably characterized by a pore size of less than about 500 A and typically about 200 A. This corresponds to a molecular weight cut-off of about 20,000.

The sulfone polymers which may be employed may include those made from cumene containing isopropylidene groups in the backbone; e.g.

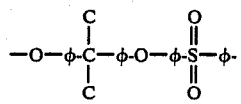

These isopropylidene sulfones, containing as repeating units ether-aromatic-isopropylidene-aromatic-ether-aromatic-sufone-aromatic groups, may typically have a molecular weight $M_n$ of 15,000–30,000, a water absorption (at 20° C.) of about 0.85 w%, a glass transition temperature of 449° K., a density of 1.25 mg/m$^3$, a tensile strength (at 20° /C.) at yield of 10,000 psi, and a coefficient of linear thermal expansion of $1.6 \times 10^{-5}$ mm/mm/°C.

Sulfone polymers which may be employed in practice of the process of this invention, may include those which are free of isopropylidene moieties in the backbone chain and wherein the phenylene groups in the backbone are bonded only to ether oxygen atoms and to sulfur atoms. These polymers, which may typically be prepared from

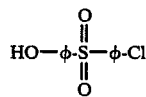

may be characterized by a backbone containing the following repeating groups:

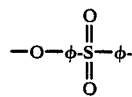

A sulfone polymer which may be employed may be a polyether sulfone which is free of isopropylidene moieties in the backbone chain and wherein the phenylene groups in the backbone are bonded only to ether-oxygen atoms and to sulfur atoms. This polymer may be characterized by molecular weight of 25,000, water absorption @ 20° C. of 2.1 w%, glass transition temperature of 487° K., tensile strength at yield of 2,200 psig at 20° C.; and coefficient of linear thermal expansion of $5.5 \times 10^{-5}$ mm/mm/°C. This polymer has a molecular weight cut off of about 20,000 and a pore size of about 200 A.

THE SEPARATING LAYER

The separating layer which permits nanofiltration in accordance with this invention includes a non-porous film, membrane, or separating layer of 0.2–1 microns, say about 0.2 microns thickness. The nanofiltration membrane is characterized inter alia by presence of a pendant ionic group which provides an ionic charge to the membrane. Although the pendant ionic group may be cationic (e.g. NH$_4$+, M+, etc.), in the preferred embodiment it is anionic. Typical preferred anionic pendant groups may include oxygen-containing groups which contain an ionizable group, preferably hydrogen.

—COOH, —SO$_3$H, and —H$_2$PO$_4$. The preferred anionic pendant group may be carboxyl —COOH.

The preferred nanofiltration membrane may be a condensation product of (i) a polyfunctional (preferably difunctional) amine and a (ii) polycarboxylic acid which contains a pendant ionic group.

The polyfunctional amines which may be employed may be aliphatic or aromatic amines characterized by the formula R (NH$_2$)$_a$ (NH)$_b$ wherein a and b, are integers or O and a plus b is at least two. The amine may be a primary or secondary amine. For purpose of simplicity, the R group will be designated as the monofunctional group, e.g. ethyl, although clearly, in the polyfunctional amine the R group will bear more than one amine group as in ethylene diamine. It will be apparent that the R group may be cyclized as in piperazine or that more than one R group may be present as in secondary amines.

In the above compound, R may be a hydrocarbon group selected from the group consisting of alkyl, aralkyl, cycloalkyl aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalky, ether, etc. Typically inertly substituted R groups may include 2-ethoxyethyl, carboethoxymethyl, 4-methylcyclohexyl, 3-ethyl-5-methylphenyl, etc. The preferred R groups may be lower alkyl, i.e. C$_1$–C$_{10}$ alkyl, groups including eg methyl, ethyl, n-propyl, i-propyl, butyls, amyls, hexyls, octyls, decyls, et. R may preferably be ethyl.

Illustrative amines which may be employed may include:

TABLE

| | |
|---|---|
| ethylene | diamine |
| triethylene | diamine |
| tetramethylene | diamine |
| pentamethylene | diamine |
| 1,3,5 - triamino | pentane |
| 1,4 - diamino | benzene |
| bis (2-aminoethyl) | amine |
| bis (2-aminomethyl) | amine |

A preferred type of polyfunctional amine may be heterocyclic amines such as:

TABLE

| |
|---|
| piperazine |
| pyrazolidine |
| imidazolidine |
| triazolidine |

The preferred polyfunctional amine may be piperazine.

The polycarboxylic acid which contains a pendant ionic group may be characterized by the formula R' (COOH)$_e$ (X)$_f$ wherein e is an integer greater than 1 (and preferably 2) and f is O or an integer. When e is 2, f is at least 1, and preferably 1. In the preferred embodiment, trimesic acid which contains three carboxyl groups, e is 2, X is carboxyl, and f is one. X is a pendant ionic group. X may be an unreacted carboxylic group in the final polymer. Alternately X may be a sulfonate or a phosphate group on the polycarboxylic acid.

For purpose of simplicity, the R' group will be nomenclated as the monofunctional group, e.g. phenyl, although clearly the polycarboxylic acid will bear more than one carboxyl group as in the preferred embodiment.

In the above compound, R' may be a hydrocarbon selected from the group consisting of alkyl, aralkyl, cycloalkyl aryl, and alkaryl, including such radicals when inertly substituted. When R' is alkyl, it may typically be methyl, ethyl, n-propyl, iso-propyl, n-butyl, i-butyl, sec-buty, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methylcycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear a non-reactive substituent such as alkyl, aryl, cycloalkyl, ether, halogen, nitro, etc. Typically inertly substituted R' groups may include 3-chloropropyl, 2-ethoxyethyl, carboethoxymethyl, 4-methyl cyclohexyl, etc. The preferred R' groups may be lower alkyl, i.e. $C_1$-$C_{10}$ alkyl, groups including e.g. methyl, ethyl, n-propyl, i-propyl, butyls, amyls, hextyls, octyls, decyls, etc.

The polycarboxylic acid (which may preferably be employed as its acid halide as in trimesoyl trichloride) may include the following:

TABLE

| hemimellitic | acid |
| trimellitic | acid |
| trimesic | acid |
| prehnitic | acid |
| mellophanic | acid |
| pyromellitic | acid |
| mellitic | acid |

Sulfonated phthalic (or isophthalic or terephthalic) acids may be employed.

Although the acids preferably employed in the form of their polyhalides (preferably the trichlorides such as trimesoyl trichloride), it is convenient to refer to the reactant as the acid.

A preferred nanofiltration membrane may be the polymer prepared by reaction of piperazine and trimesoyl chloride:

A typical useful commercially available nanofiltration membrane which may be employed may include the Film Tec NF-40 brand membrane containing approximately equimolar amounts of moieties derived from piperazine and trimesoyl chloride—of film thickness of about 0.2 microns. This membrane is characterized by the presence of pendant anionic carboxyl groups.

THE COMPOSITE MEMBRANE

It is a feature of this invention that it may utilize a composite membrane which comprises (i) an optional carrier layer characterized by porosity and mechanical strength for supporting a porous support layer and a nanofiltration separating layer, (ii) a porous support layer such as a polysulfone membrane of molecular weight of 5,000–100,000, of thickness of 10–80 microns, and of molecular weight $M_n$ cutoff of 25,000–100,000 and (iii) as a nanofiltration separating layer, a condensation product of (i) a polyfunctional amine and (ii) a polycarboxylic acid which contains a pendant ionic group, preferably a pendant carboxyl group.

The composite membrane of this invention may be utilized in various configurations. It is, for example, possible to utilize the composite in a plate-and-frame configuration in which separating layers may be mounted on the porous support layer with the carrier layer.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that,

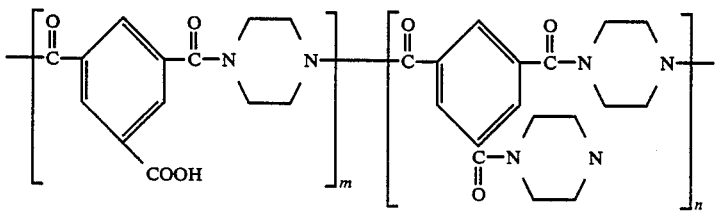

In this polymer, repeat group m is typically present in amount of 15-100 mole %, say 95 mole % and repeat group n is typically present in amount of 0-50, say 5 mole %. Typical film thickness may be 0.05, say 0.2 microns. It is apparent that in this preferred embodiment, the pendant ionic group is the unreacted carboxyl group—COOH.

although only one feed channel is present, the single feed channel in the wound assembly will be adjacent to two face of the membrane layer. The spiral wound configuration may be formed by wrapping the assembly around the conduit a plurality of times to form a readily handleable unit. The unit is fitted within a shell (in manner comparable to a shell-and-tube heat exchanger)

provided with an inlet at one end and an outlet at the other. A baffle like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn from the system. In this embodiment, it will be apparent that the system may not include a carrier layer.

In another embodiment, it is possible to utilize the system of this invention as a tubular or hollow fiber. In this embodiment, the polysulfone porous support layer may be extruded as a fine tube with a wall thickness of typically 0.001-0.1 mm. The extruded tubes are passed through a bath which may contain a solution of the nanofiltration membrane polymer which is deposited on the support layer and cured in situ. A bundle of these tubes is secured (with an epoxy adhesive) at each end in a header; and the fibers are cut so that they are flush with the ends of the header. This tube bundle is mounted within a shell in a typical shell-and-tube assembly.

In operation, the charge liquid is admitted to the tube side and passes through the inside of the tubes and exist as retentate. During passage through the tubes, permeate passes through the non-porous separating layer and permeate is collected in the shell side.

In this embodiment, it will be apparent that the system may not normally include a carrier layer. In still another embodiment, the porous support layer may be omitted; and the separating layer is extruded and thereafter cured in situ prior to mounting in the headers.

NANOFILTRATION

It is a feature of the membranes herein disclosed that they are found to be particularly effective when used in nanofiltration. In nanofiltration, a charge liquid which may in a typical embodiment contain a mixture of crude oil and sea water, contacts a nanofiltration membrane bearing pendant ionic groups. The membrane passes monovalent ions but rejects polyvalent ions and also organics which have a molecular weight greater than about 300.

In practice of the process of this invention, aqueous charge in liquid phase may be at 30° C.-90° C., say 40° C. and 50-300 psig, say 200 psig. A pressure drop of 35-285 psig, say 185 psi is commonly maintained across the membrane.

The permeate which passes through the nanofiltration system includes water, monovalent ions, and a substantially decreased content of hydrocarbon. Typically the permeate may be aqueous liquid containing 10,000-50,000, say 25,000 (w) ppm of monovalent ions measured as Cl$^-$ and say 500-5000, say 2000 (w) ppm of polyvalent ions, and less than 5 (w) ppm of hydrocarbon liquid (typically 0-10 (w) ppm, say 2 (w) ppm).

The retentate includes aqueous liquid containing 10,000-70,000, say 50,000 (w) ppm of monovalent ions measured as Cl$^-$ and 5000-10,000 (w) ppm, say 8000 (w) ppm of polyvalent ions and 400-900, say 700(w) ppm of hydrocarbon liquid.

Nanofiltration may typically be carried out at a flux of 5-30, say 20 gallons per square foot per day with a typical rejection (measured in terms of 100 times the weight of salt retained in the Retentate divided by the weight of salt in the Feed) of 25-97% of the divalent salts and 100% of the hydrocarbon.

Ultrafiltration membranes (falling outside the scope of this invention) are undesirable in that they do not remove the organic components from the aqueous charge liquid. Reverse osmosis membranes (falling outside the scope of this invention) are also unsatisfactory because they reject all the salts. This eventually causes a build-up of salts in the feed (to which the retentate is normally recycled) and there is thus a corresponding reduction in membrane productivity.

Practice of the process of this invention will be apparent to those skilled in the art from inspection of the following example wherein, as elsewhere in this specification, all parts are parts by weight unless they were stated.

DESCRIPTION OF SPECIFIC EMBODIMENT

Example I

In this example, which represents the best mode presently known of carrying out the process of this invention, the aqueous portion of the charge (100 parts) containing immiscible hydrocarbon liquid is a typical produced water from an off-shore petroleum production platform. This aqueous charge contains 50 w% crude oil.

The aqueous portion of this charge (50 w%) of the total which contains (basis aqueous portion:)

5 w% soluble non-hydrocarbon organic matter
0.1 w% insoluble non-hydrocarbon organic matter
0.01 w% inorganic soluble salts
0.1 w% inorganic insoluble salts
50 w% insoluble hydrocarbons Practice of the process of this invention includes maintaining the charge (100 parts) in a quiescent contacting zone at temperature of 40° C. for 12 hours. There separates about 50 parts of supernatant lighter layer of hydrocarbon liquid which may be separated and passed as dewatered crude to crude processing. The heavier layer (about 50 parts) contains aqueous liquid contains 0.1 w% of immiscible hydrocarbon.

The heavier layer (50 parts) of aqueous liquid containing a reduced amount of immiscible hydrocarbon liquid is passed to a quiescent skimming operation. Here it is maintained at 40° C. for 12 hours at yield (i) an upper lighter layer of hydrocarbon liquid (0.3 parts) and (ii) a lower (49.7 parts) layer of aqueous liquid containing a decreased amount (about 160 ppmw) of immiscible hydrocarbon liquid.

The upper layer contains about 0.2 parts of hydrocarbon and 0.1 parts of water; the lower aqueous layer contains 49.7 parts of water and 160 ppm(w) of hydrocarbon liquid.

The upper layer may be recycled to the charge to the separation operation. The lower layer of aqueous liquid containing a decreased amount of immiscible hydrocarbon liquid.

In this example, which represents the best mode presently known of carrying out the process of this invention, the nanofiltration separation layer is mounted on a porous support layer of a commercially available (from Film Tec Corp) composite containing a non-woven polyester backing as carrier layer bearing, as a porous support layer, a polyether polysulfone polymer.

The carrier layer employed is a porous, flexible, non-woven fibrous polyester formed of thermally bonded strands and characterized by a fabric weight of 80±8 grams per square yard, a thickness of 4.2±0.5 mils, a tensile strength (in the machine direction) of 31 psi and (in the cross direction) of 10 psi, and a Frazier air permeability of 6 cu.ft/mm/sq. ft. @ 0.5 inches of water.

The porous support layer, which is mounted on the carrier layer is a sheet of polyether polysulfone polymer (which is free of isopropylidene moieties in the backbone chain) wherein the phenylene groups in the backbone are bonded only to ether-oxygen atoms and to sulfur atoms. This polymer may be characterized by molecular weight "$M_n$" of 25,000, water absorption at 20° C. of 2.1 w%, glass transition temperature of 487° K., tensile strength at yield of 2200 psig at 20° C., coefficient of linear thermal expansion of $5.5 \times 10^{-5}$ mm/mm/°C. This polymer has a molecular weight cutoff of about 20,000 and a pore size of about 200 A.

The nanofiltration membrane is the commercially available Film Tec NF-40 membrane of thickness of 0.2 microns. The membrane is made by condensation polymerization of piperazine and trimesoyl chloride and contains approximately equmolar quantities of units derived from the former and from the latter. It has the formula:

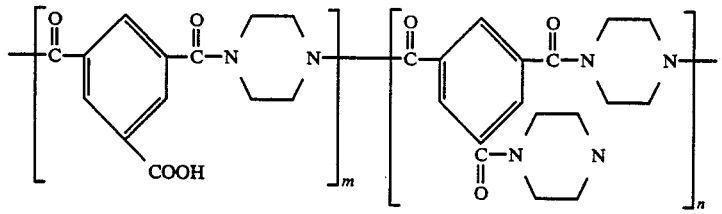

The so-bonded assembly is mounted on a framework in a nanofiltration cell to which is admitted at temperature of 40° C. and pressure of 200 psig, the lower layer of aqueous liquid containing a decreased amount of immiscible hydrocarbon liquid from the quiescent skimming operation. Charge liquid is admitted.

In this Example, it is found that the aqueous charge containing 160 (w) ppm of hydrocarbon may be treated by nanofiltration to yield a permeate or filtrate containing 32 (w) ppm (as determined by ASTM Freon Ext. Method). The Rejection is 80 w% (which is highly satisfactory) at a flux of 23 gfd at 200 psig. The aqueous permeate is of sufficient purity to permit it to be discharged without ecological demerits. The retentate may be recycled to the charge to the separation operation.

Examples II*–VI*

In this series of control runs the ultrafiltration membranes employed (mounted on a carrier layer and support layer) are as follows:

TABLE

| Example | Membrane |
|---------|----------|
| II* | Abcor MSD 707 Brand membrane of Abcor Co, a polymer having molecular weight cut-off of 200,000–600,000. |
| III* | Abcor MFM 251 Brand membrane of Abcor Co, a polymer and having molecular weight cut-off of 20,000–150,000 |
| IV* | Abcor HFM 100 Brand membrane of Abcor Co, a polymer having molecular weight cut-off of 10,000–30,000. |
| V* | Memtek Brand ultrafiltration membrane of Memtek Co. |
| VI* | Nucleopore Brand membrane of Nucleopore Co, having a molecular weight cut-off of 1000. |

In the case of each of these control examples, charge aqueous liquid was admitted to the ultrafiltration membranes. The feed concentration (w ppm), the permeate concentration (w ppm), the Rejection (w%) and the Flux (gfd) are tabulated infra. Also set forth is the comparable data for Experimental Example I.

TABLE

| Membrane of Example | Feed | Permeate | Rejection | Flux |
|---|---|---|---|---|
| I | 160 | 32 | 80 | 23 |
| II* | 1250 | 1175 | 6 | 410 |
| III* | 1250 | 1150 | 8 | 206 |
| IV* | 1250 | 1050 | 16 | 59 |
| V* | 700 | 600 | 14 | — |
| VI* | 2800 | 2200 | 21 | 22 |

From the above Table, it is apparent that the ultrafiltration membrane of Control Examples II*–VI* are unsatisfactory. The concentration in the permeate is not significantly different from that in the feed. The Rejection is low (although the Flux is high). A satisfactory membrane is one which is primarily characterized by a high Rejection. A membrane with a high Flux and a low Rejection is not considered satisfactory.

Results comparable to those of Example I may be obtained using nanofiltration membranes bearing other pendent anionic groups.

Although this invention has been illustrated by reference to specific embodiments, it will be apparent to those skilled in the art that various charges and modifications may be made which clearly fall within the scope of the invention.

We claim:

1. The method of treating an aqueous charge containing immiscible hydrocarbon liquid which comprises maintaining said aqueous charge containing immiscible hydrocarbon liquid in a quiescent separating operation thereby producing (i) a supernatant lighter layer of hydrocarbon liquid and (ii) a heavier layer of aqueous liquid containing a reduced amount of immiscible hydrocarbon liquid;

withdrawing said supernatant lighter layer of hydrocarbon liquid;

passing said heavier layer of aqueous liquid containing a reduced amount of immiscible hydrocarbon liquid to a quiescent skimming operation thereby producing (i) an upper lighter layer of hydrocarbon liquid and (ii) a lower layer of aqueous liquid containing a decreased amount of immiscible hydrocarbon liquid;

recycling said upper lighter layer of hydrocarbon liquid recovered from said quiescent skimming operation to said quiescent separating operation;

passing said lower layer of aqueous liquid containing a decreased amount of immiscible hydrocarbon liquid from said quiescent skimming operation to a nanofiltration operation;

nanofiltering said lower layer of aqueous liquid containing a decreased amount of immiscible hydrdocarbon liquid thereby forming (i) aqueous filtrate containing a diminished amount of immiscible hydrocarbon liquid and (ii) aqueous retentate containing immiscible hydrocarbon liquid;

recycling said aqueous retentate containing immiscible hydrocarbon liquid to said separating operation or said skimming operation; and recovering said aqueous filtrate containing a diminished amount of immiscible hydrycarbon liquid.

2. The method of treating an aqueous charge containing an aqueous charge containing immiscible hydrocarbon liquid as claimed in claim 1 wherein said immiscible hydrocarbon liquid is crude petroleum.

3. The method of treating an aqueous charge containing an aqueous charge containing immiscible hydrocarbon liquid as claimed in claim 1 wherein said aqueous charge containing immiscible hydrocarbon liquid is produced water containing crude petroleum.

4. The method of treating an aqueous charge containing an aqueous charge containing immiscible hydrocarbon liquid as claimed in claim 1 wherein said nanofiltering is carried out across a membrane which is a condensation product of a polyfunctional amine and a polycarboxylic acid bearing a pendant ionic group.

5. The method of treating an aqueous charge containing immiscible hydrocarbon liquid as claimed in claim 4 wherein said pendant ionic group is carboxyl, sulfonate or dihydrogen phosphate.

6. The method of treating an aqueous charge containing immiscible hydrocarbon liquid as claimed in claim 4 wherein said pendant ionic group is carboxyl.

7. The method of treating an aqueous charge containing immiscible hydrocarbon liquid as claimed in claim 4 wherein said polycarboxylic acid is a dicarboxylic acid.

8. The method of treating an aqueous charge containing immiscible hydrocarbon liquid as claimed in claim 4 wherein said polycarboxylic acid is trimesic acid.

9. The method of treating an aqueous charge containing immiscible hydrocarbon liquid as claimed in claim 4 wherein said polycarboxylic acid is in the form of its acid chloride.

10. The method of treating an aqueous charge containing immiscible hydrocarbon liquid as claimed in claim 4 wherein said polycarboxylic acid is trimesic acid, used in the form of its trichloride.

11. The method of treating an aqueous charge containing immiscible hydrocarbon liquid as claimed in claim 4 wherein said polyfunctional amine is a difunctional amine.

12. The method of treating an aqueous charge containing immiscible hydrocarbon liquid as claimed in claim 4 wherein said polyfunctional amine is a heterocyclic amine.

13. The method of treating an aqueous charge containing immiscible hydrocarbon liquid as claimed in claim 4 wherein said polyfunctional amine is piperazine.

14. The method of treating an aqueous charge containing an aqueous charge containing immiscible hydrocarbon liquid as claimed in claim 1 wherein said nanofiltering is carried out across a membrane which is a polymeric condensation product of piperazine and trimesoyl trichloride.

15. The method of treating produced water from a crude oil drilling operation, said produced water containing water and immiscible crude oil which comprises.

maintaining said produced water in a quiescent separating operation thereby producing (i) a supernatant lighter layer of crude oil and (ii) a heavier layer of water containining a reduced amount of crude oil withdrawing said supernatant lighter layer of crude oil;

passing said heavier layer of water to a quiescent skimming operation thereby producing (i) an upper lighter layer of crude oil and (ii) a lower layer of water containing a decreased amount of crude oil;

recycling said upper lighter layer of crude oil recovered from said quiescent skimming operation to said quiescent separating operation;

passing said lower layer of water containing a decreased amount of crude oil from said quiescent skimming operation to a nanofiltration operation;

nanofiltering said lower layer of water containing a decreased amount of crude oil in a nanofilteration operation including as a nanofiltration membrane, of thickness of 0.05-1 microns, the polymer prepared by the condensation polymerization reaction of piperazine and trimesoyl trichloride thereby forming (i) aqueous filtrate containing a diminished amount of immiscible crude oil and (ii) water retentate containing immiscible crude oil;

recovering said water retentate containing immiscible crude oil; and recovering said aqueous filtrate containing a diminished amount of immiscible crude oil.

16. The method of treating an aqueous charge containing immiscible crude oil which comprises nanofiltering said aqueous charge containing immiscible crude oil thereby forming (i) aqueous filtrate containing a diminished amount of immiscible crude oil and (ii) aqueous retentate containing immiscible crude oil;

recovering said aqueous filtrate containing a diminished amount of immiscible crude oil; and recovering said aqueous retentate containing immiscible crude oil.

17. The method of treating an aqueous charge containing immiscible crude oil as claimed in claim 16 wherein nanofiltering is carried out across a membrane which is a polymeric condensation product of piperazine and trimesoyl trichloride.

* * * * *